United States Patent [19]
Dekumbis et al.

[11] Patent Number: 5,651,946
[45] Date of Patent: Jul. 29, 1997

[54] EXHAUST GAS CATALYTIC CONVERTER, PARTICULARLY FOR MOTOR CARS

[75] Inventors: Roger Dekumbis, Zürich; Jean Paul Stringaro, Winterthur, both of Switzerland

[73] Assignee: Sulzer Chemtech AG, Winterthur, Switzerland

[21] Appl. No.: 719,741

[22] Filed: Sep. 25, 1996

Related U.S. Application Data

[63] Continuation of Ser. No. 284,958, Aug. 2, 1994, abandoned.

[30] Foreign Application Priority Data

Aug. 5, 1993 [EP] European Pat. Off. ............ 93810553

[51] Int. Cl.$^6$ ............................. B01D 53/34; F01N 3/10
[52] U.S. Cl. ........................ 422/180; 422/171; 422/177; 422/211; 422/222; 60/299; 502/527
[58] Field of Search ............................ 422/168–171, 422/177, 180, 211, 222; 60/299; 502/439, 527; 428/593, 594, 116

[56] References Cited

U.S. PATENT DOCUMENTS

| | | | |
|---|---|---|---|
| Re. 33,013 | 8/1989 | Takeuchi et al. | 422/180 |
| 4,318,888 | 3/1982 | Chapman et al. | 422/180 |
| 4,719,090 | 1/1988 | Masaki | 422/171 |
| 4,882,130 | 11/1989 | Asai et al. | 422/180 |
| 5,154,894 | 10/1992 | MacFarlane et al. | 422/180 |
| 5,240,663 | 8/1993 | Stringaro et al. | 264/150 |
| 5,328,774 | 7/1994 | Maus et al. | 422/180 |
| 5,350,566 | 9/1994 | Stringaro | 422/222 |

FOREIGN PATENT DOCUMENTS

| | | |
|---|---|---|
| 0433222A1 | 6/1991 | European Pat. Off. . |
| 39 23 094 A1 | 1/1991 | Germany . |
| 41 38 851 A1 | 5/1993 | Germany . |
| 2079174 | 1/1982 | United Kingdom . |
| WO92/02716 | 2/1992 | WIPO . |

*Primary Examiner*—Robert J. Warden
*Assistant Examiner*—Hien Tran
*Attorney, Agent, or Firm*—Townsend and Townsend and Crew LLP

[57] ABSTRACT

The exhaust gas catalytic converter (1) with an ordered substrate structure (10) for catalysing material comprises layers (13) with parallel channels. The layers are substantially parallel to the direction (15) of main flow of the exhaust gas. The cross-sectional surfaces of the substrate structure along the direction of main flow has, according to the invention, at least partly variable area and/or variable shape; the channels make with the direction of main flow and angle between about 10° and 70° and the channels in adjacent layers are open towards each other and cross each other. The exhaust gas catalytic converter according to the invention enables its shape to be adapted to the conditions of small space.

6 Claims, 2 Drawing Sheets

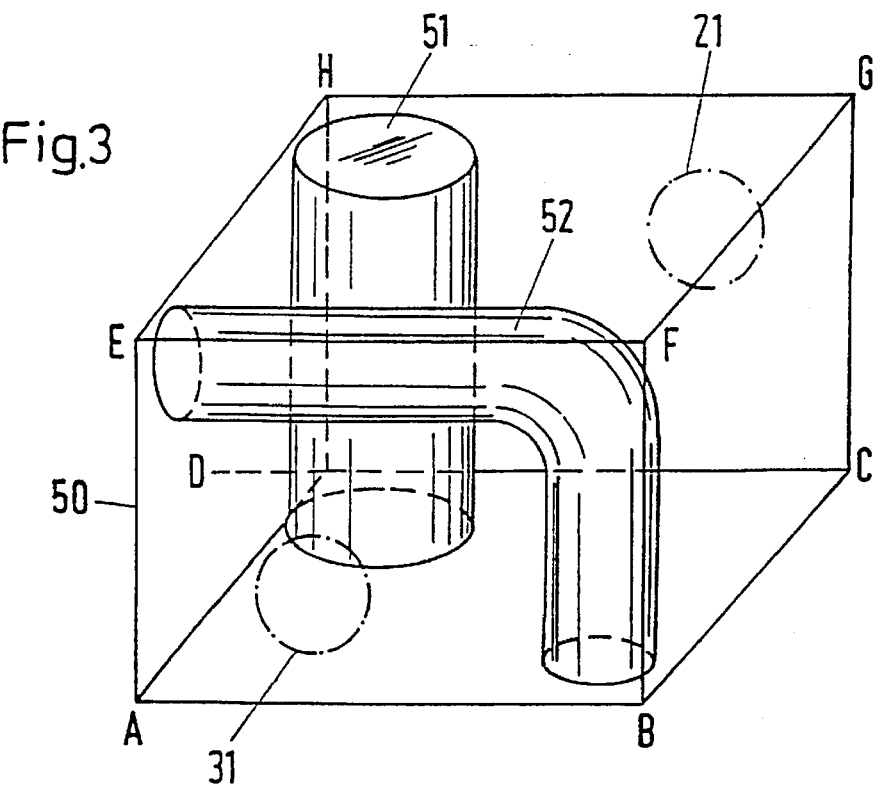
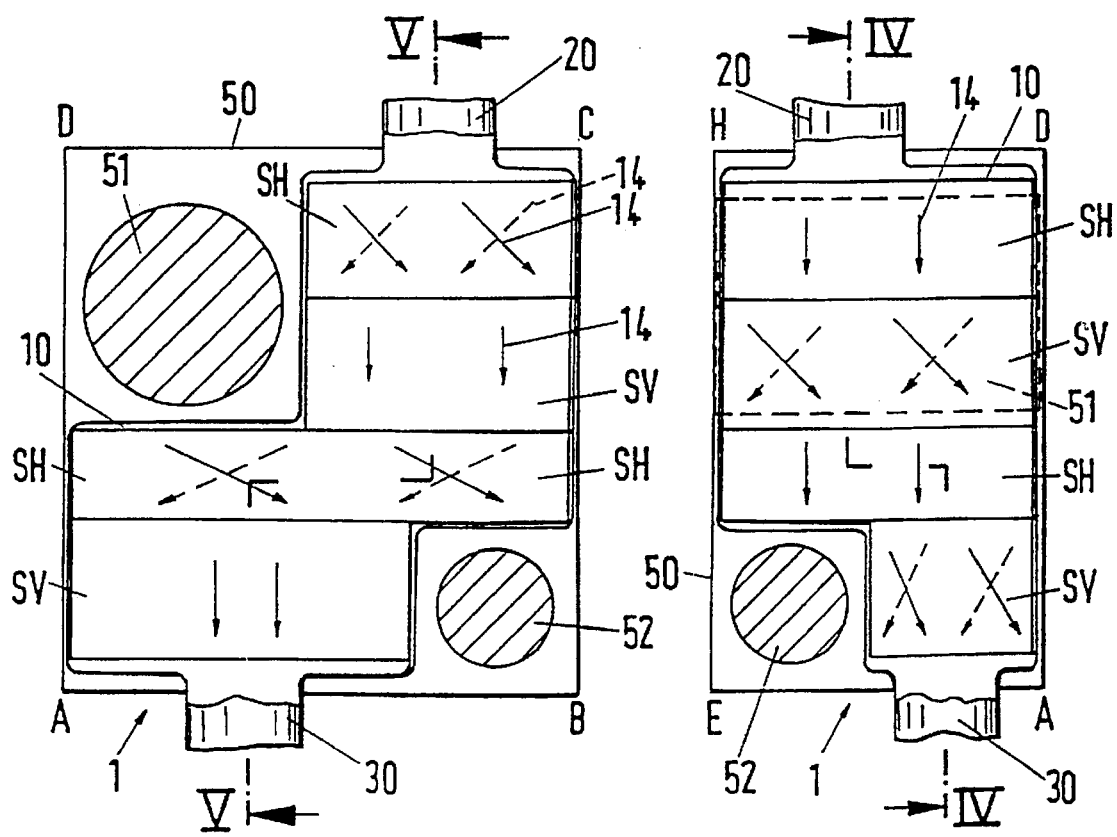

EXHAUST GAS CATALYTIC CONVERTER, PARTICULARLY FOR MOTOR CARS

This is a continuation of application Ser. No. 08/284,958, filed Aug. 2, 1994, now abandoned.

BACKGROUND OF THE INVENTION

The invention relates to an exhaust gas catalytic converter and to the use of such device in motor cars or as a stationary apparatus for catalytic afterburning.

The exhaust gas catalytic converter is a component integrated in the exhaust gas system of e.g. a motor vehicle and in which catalytic afterburning takes place. The afterburning breaks down pollutants, namely carbon monoxide, hydrocarbons and nitrogen oxides, i.e. they are converted to carbon dioxide, nitrogen and water. The afterburning should take place as close as possible to the engine to make use of the warm content of exhaust gases during cold starting without large losses so that the operational temperature (250°–750° C.) is achieved after a warming-up phase which is as short as possible. A known design of the exhaust gas catalytic converter is a monolith, in which a ceramic substrate has a honeycomb structure. This honeycomb structure is formed by a plurality of parallel channels. Because all the channels must have the same length, the honeycomb structure has a substantially cylindrical shape, i.e. cross-sectional surfaces of the honeycomb structure have the same size and the same shape along their whole length.

Due to limited space in the vicinity of a motor car engine, it is usually not possible to integrate an exhaust gas catalytic converter of the known design satisfactorily in the exhaust gas system. The question arises whether there are means which would enable better integration. The basis of the present invention is the realization that such means might actually be available: namely if it were possible to find an exhaust gas catalytic converter which could be shaped more flexibly than known devices. A more flexible shaping would, for instance, enable, in the case of predetermined obstructions in the vicinity of the engine, to form the catalytic converter such that it could be fixed very close to the outlet of exhaust gases from the engine. It is therefore a particular aim of the invention to devise an exhaust gas catalytic converter, possessing this flexibility.

SUMMARY OF THE INVENTION

The present invention is directed to an exhaust gas catalytic converter comprising a substrate structure with an inlet port and an exhaust port. The exhaust gas flows in an exhaust direction from the inlet port to the outlet port. The substrate comprises a number of segments in the direction of flow, each segment having multiple layers of parallel channels. The channels extend substantially straight through each layer at an angle of about 10° to 70° with respect to the exhaust flow direction. In addition, the channels in adjacent layers face each other and are oriented so that they intersect each other.

The substrate has a variable transverse cross-sectional area and a variable transverse cross-sectional shape that facilitates placement of the catalytic converter in close proximity to the outlet of exhaust gases in an engine. Although this variable shape and cross-sectional area would ordinarily establish non-homogenous flow through the converter, the special design of the channels that are open towards each other and intersect with each other facilitates mixing of the gas streams across the cross-section of the substrate. Therefore, any differences in concentration or temperature resulting from the variable shape of the substrate are offset by this radial mixing within the intersecting channels.

Due to the variable cross-section of the catalytic converter according to the invention a flow field is established in the substrate structure, which is not homogenous. This would be—as regards known exhaust gas catalytic converters—in itself a serious disadvantage. In view of the special design of the channel system with channels that are open towards each other and cross each other (cf. EP-A 0 433 222=P.6318) radial mixing of the gas stream across the cross-section is obtained, whereby differences in concentration and temperature, which would be the consequence of the non-homogenous flow field, are continuously evened out.

BRIEF DESCRIPTION OF THE DRAWINGS

The invention will now be explained in greater detail with reference to the drawings, in which:

FIG. 3 shows a cuboid-shaped space with obstacles for which a catalytic converter according to the invention should be designed which utilizes the free space as well as possible, FIG. 4 shows a design associated with FIG. 3 illustrated in a horizontal longitudinal section, and FIG. 5 shows the corresponding vertical longitudinal section.

DESCRIPTION OF THE SPECIFIC EMBODIMENTS

Figure 1:
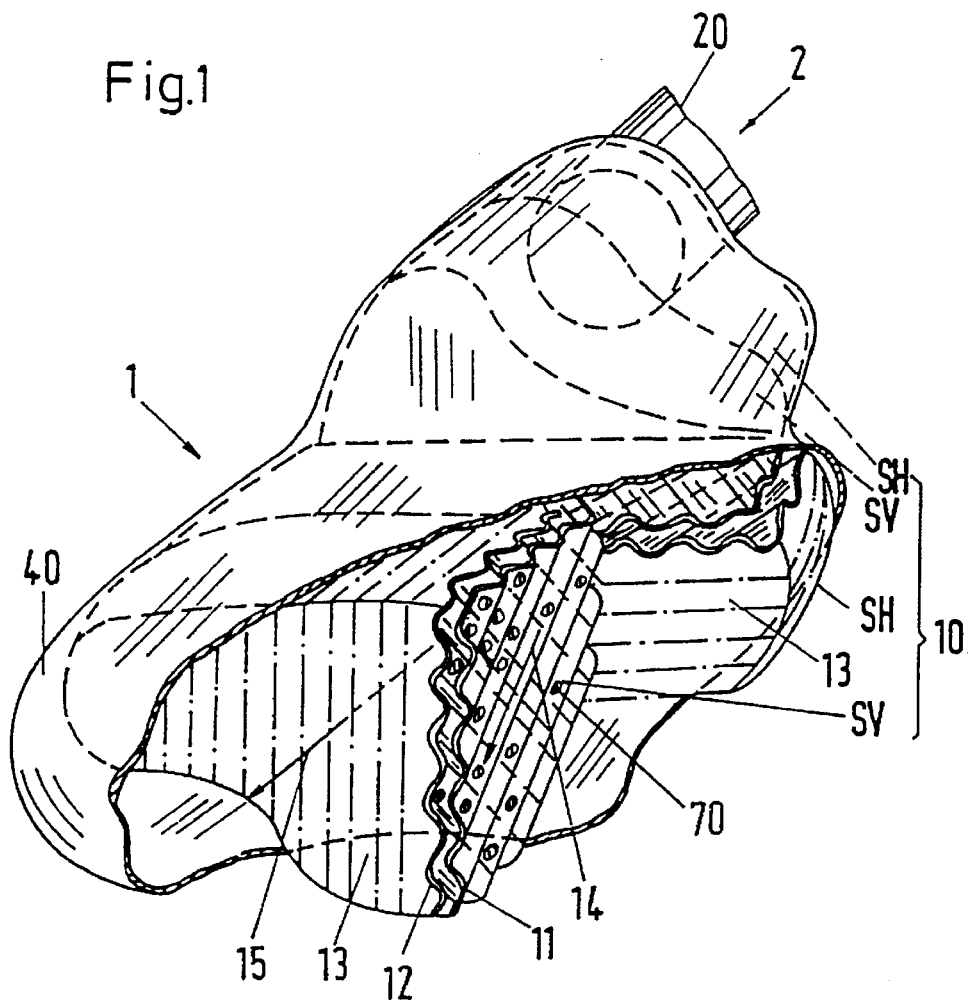
FIG. 1 shows, partly in section, a catalytic converter according to the invention for which a pronounced asymmetrical shape was chosen for the purpose of illustration.

The exhaust gas catalytic converter 1 shown in FIG. 1 comprises a substrate structure 10 and a housing 40. Uncleaned exhaust gas, arrow 2, is brought in through an inlet port 20. The substrate structure 10 is divided into segments, namely alternately segments SH and SV. A segment is made of corrugated metal sheets or foils 11 and 12, which form layers 13 which are substantially parallel to the direction 15 of main flow of the exhaust gas. The corrugated shape of a sheet 11 provides on both sides parallel channels, which make with the direction 15 of main flow an angle between 10° and 70°. The arrow 14 indicates the direction of flow through one such channel. The channels of adjacent layers 13 are open with respect to each other and cross each other. The layers 13 extend in the segments SV vertically and in the segments SH horizontally.

Figure 2:
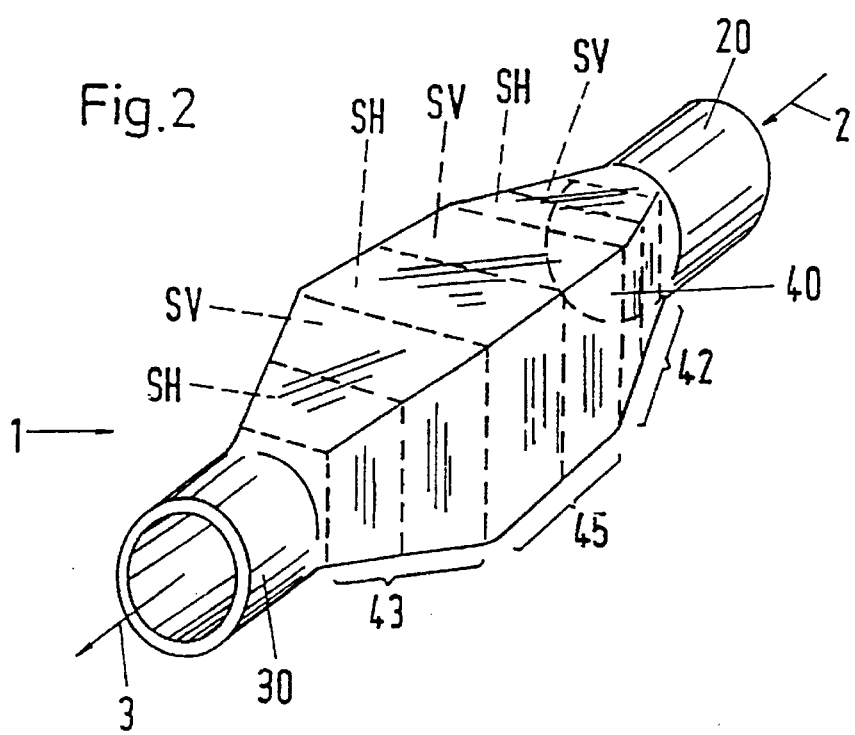
FIG. 2 shows a second embodiment of a catalytic converter according to the invention.

The catalytic converter 1 shown in FIG. 2, which has a much simpler shape than that shown in FIG. 1, comprises six segments SH and SV. The segments in regions 42 and 43 at the inlet port 20 and outlet port 30 have the shape of a truncated pyramid, while in the central part 45 the segments are cuboid-shaped. The arrow 3 indicates the outlet stream of the cleaned exhaust gas.

In FIGS. 3 to 5 is shown an representative of designing a catalytic converter according to the invention for a given space 50 containing obstacles 51 and 52. The space 50 is defined by a cuboid with vertices A, B, C, D, E, F, G and H. On the rear side with vertices C, D, G and H should be situated the inlet port 20 for the uncleaned exhaust gas; the position is marked by a circle 21 drawn in a dash-and-dot line. The circle 31 indicates the position for the outlet port 30 on the front side. FIG. 4 is a section through a catalytic converter along line IV—IV in FIG. 5; FIG. 5 is a section along line V—V in FIG. 4. The substrate structure 10 is composed of four cuboid-shaped segments SH and SV. The arrows 14 indicate again the direction of flow through the channels.

It is assumed, in the illustrated examples, that the layers 13 are of metallic, foil-shaped material which is corrugated or zigzag folded. It is, however, also possible to make the substrate structure 10 of an extruded ceramic material (cf. EP-PS 0 444 172=P.6303). Also mixed forms are possible in principle: some segments of ceramic material, some of metal.

The walls of the substrate structure 10 may contain openings, e.g. round holes 70. If larger, rhombic openings are used, the substrate structure 10 may have the form of a vortex packing, as is known from WO 90/10497 (=P.6332). In such vortex packing the channel system allows flow in all directions transverse to the direction 15 of main flow and has a good mixing ability so that it has no adverse effect when the substrate structure 10 is not divided into segments.

In the substrate structures 10 shown in FIG. 1 the mixing ability is anisotropic. It is therefore advantageous to divide into segments, and to direct the layers 13 of adjacent segments—perpendicularly to the direction 15 of main flow—differently. Particularly the layers 13 of adjacent segments SH and SV should extend in directions which are displaced through 90° with respect to each other.

It is advantageous when the walls of the substrate structure are finely structured to provide improvement of the catalytic activity by increasing the specific surface. In this sense the surface structuring may be in the form of a washcoat.

We claim:

1. An exhaust gas catalytic converter comprising a substrate structure defining an inlet port and an exhaust port and an exhaust flow direction therebetween, the substrate structure having a length in the exhaust flow direction and a transverse cross-sectional area and a transverse cross-sectional shape, the transverse cross-sectional area and shape being non-uniform along the length of the structure, the substrate structure comprising at least first and second segments that are immovably fixed relative to the inlet port, each segment having at least first and second layers defining parallel flow channels, the layers in the first segment extending in a transverse direction relative to the layers in the second segment, the flow channels in each segment being oriented at an angle of 10° to 70° relative to the exhaust flow direction, wherein the flow channels in the first layer intersect the flow channels in the second layer.

2. The catalytic converter of claim 1 wherein the first and second layers in the first and second segments extend in perpendicular directions relative to each other.

3. The catalytic converter of claim 1 wherein the first and second layers at least partially comprise corrugated metallic foil-shaped material.

4. The catalytic converter of claim 3 wherein the corrugated metallic foil-shaped material defines openings fluidly coupled the first and second layers with each other.

5. The catalytic converter of claim 1 wherein the substrate structure comprises an extruded ceramic material.

6. An exhaust gas catalytic converter comprising a substrate structure defining an inlet port and an exhaust port and an exhaust flow direction therebetween, the substrate structure having a length in the exhaust flow direction and a transverse cross-sectional area and a transverse cross-sectional shape, the transverse cross-sectional area and shape being non-uniform along the length of the structure, the substrate structure being immovably fixed relative to the inlet port and comprising multiple layers of parallel channels, each channel extending substantially straight through the respective layer and being oriented at an angle of 10° to 70° relative to the exhaust flow direction.

* * * * *